(12) United States Patent
Tuxen (10) Patent No.: US 12,109,473 B2
(45) Date of Patent: *Oct. 8, 2024

(54) METHOD AND DEVICE FOR SIMULATING GOLF SHOTS FOR A USER

(71) Applicant: TRACKMAN A/S, Vedbaek (DK)

(72) Inventor: Fredrik Tuxen, Rungsted Kyst (DK)

(73) Assignee: TRACKMAN A/S, Hørsholm (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,216

(22) Filed: Feb. 23, 2022

(65) Prior Publication Data

US 2022/0176224 A1 Jun. 9, 2022

Related U.S. Application Data (63) Continuation of application No. 16/693,920, filed on Nov. 25, 2019, now Pat. No. 11,285,367.

(60) Provisional application No. 62/771,382, filed on Nov. 26, 2018.

(51) Int. Cl.
A63B 69/36 (2006.01)
A63B 71/06 (2006.01)
G09B 19/00 (2006.01)

(52) U.S. Cl.
CPC .......... *A63B 69/36* (2013.01); *A63B 71/0622* (2013.01); *G09B 19/0038* (2013.01); *A63B 69/3605* (2020.08)

(58) Field of Classification Search
None
See application file for complete search history.

(56) References Cited

U.S. PATENT DOCUMENTS

| | | | | |
|---|---|---|---|---|
| 5,507,485 A | * | 4/1996 | Fisher | A63B 71/06 473/131 |
| 2008/0312010 A1 | | 12/2008 | Marty et al. | |
| 2009/0036237 A1 | | 2/2009 | Nipper et al. | |
| 2009/0209358 A1 | | 8/2009 | Niegowski | |
| 2010/0121227 A1 | | 5/2010 | Stirling et al. | |
| 2010/0234769 A1 | | 9/2010 | Poliac et al. | |
| 2013/0260922 A1 | | 10/2013 | Yontz et al. | |
| 2014/0234814 A1 | | 8/2014 | Krosky et al. | |
| 2015/0126308 A1 | | 5/2015 | Penn et al. | |

FOREIGN PATENT DOCUMENTS

| | | |
|---|---|---|
| CN | 102470267 | 5/2012 |
| CN | 102918559 | 2/2013 |
| CN | 103252070 | 8/2013 |
| CN | 105107167 | 12/2015 |
| JP | 2009-226215 | 10/2009 |
| JP | 2013-154177 | 8/2013 |
| JP | 2017-099905 | 6/2017 |
| JP | 2019-146927 | 9/2019 |

* cited by examiner

*Primary Examiner* — Damon J Pierce
(74) *Attorney, Agent, or Firm* — Fay Kaplun & Marcin, LLP

(57) ABSTRACT

A method and a device are for simulating a golf shot for a user. The method includes receiving golf course information and receiving historical golf shot capabilities of the user in combination with generating at least one current golf shot simulation based on a current position of a golf ball on the golf course, the golf course information and the historical golf shot capabilities of the user and determining a strategy for the current golf shot based on the at least one current golf shot simulation.

21 Claims, 9 Drawing Sheets

| Shot Type | Ball Speed [mph] | LaunchAngle [deg] | LaunchDir. [deg] | Spin Rate [rpm] | Spin Axis [deg] | MissHit [%] |
|---|---|---|---|---|---|---|
| 58° Wedge | 2 | 0.9 | 0.7 | 500 | 3.0 | 15 |
| 58° Wedge (3/4) | 3 | 1.5 | 1.1 | 600 | 3.5 | 18 |
| 58° Wedge (1/2) | 2 | 2.0 | 1.5 | 500 | 2.9 | 20 |
| 54° Wedge | 2 | 1.2 | 1.4 | 500 | 3.5 | 15 |
| 54° Wedge (3/4) | 3 | 1.5 | 1.6 | 600 | 3.5 | 18 |
| 54° Wedge (1/2) | 2 | 1.9 | 1.7 | 500 | 2.9 | 20 |
| 50° Wedge | 2 | 1.1 | 1.3 | 500 | 3.2 | 18 |
| 50° Wedge (3/4) | 3 | 1.6 | 1.1 | 600 | 3.0 | 20 |
| PW | 2 | 1.2 | 1.0 | 400 | 3.4 | 25 |
| 9 iron | 3 | 1.0 | 1.3 | 400 | 3.8 | 25 |
| 8 iron | 3 | 1.1 | 1.3 | 400 | 3.5 | 25 |
| 7 iron | 3 | 0.9 | 1.4 | 400 | 3.4 | 26 |
| 6 iron | 3 | 1.0 | 1.6 | 500 | 3.7 | 28 |
| 5 iron | 3 | 1.3 | 1.7 | 500 | 3.8 | 28 |
| 4 iron | 3 | 1.4 | 1.7 | 500 | 4.3 | 31 |
| 3 Hybrid | 3 | 1.5 | 1.2 | 600 | 3.6 | 16 |
| 5 wood | 4 | 1.0 | 2.1 | 400 | 5.3 | 20 |
| Driver | 4 | 1.3 | 2.5 | 500 | 7.0 | 21 |

| Probability | Dist. (X) | Side (Z) |
|---|---|---|---|
| Left | 0.45 | 107 m | -5.0 m |
| Long | 0.10 | 110 m | -0.5 m |
| Right | 0.20 | 103 m | +3.1 m |
| Short | 0.25 | 96 m | +0.5 m |
| Avg. | | 105 m | -1.5 m |

| Shot Type | Ball Speed [mph] | LaunchAngle [deg] | LaunchDir. [deg] | Spin Rate [rpm] | Spin Axis [deg] |
|---|---|---|---|---|---|
| 58° Wedge | 70 | 35 | +0.3 | 11000 | +1.0 |
| 58° Wedge (3/4) | 61 | 35 | +0.1 | 10200 | +0.5 |
| 58° Wedge (1/2) | 52 | 34 | +0.1 | 9500 | 0 |
| 54° Wedge | 80 | 32 | +0.3 | 10200 | +1.5 |
| 54° Wedge (3/4) | 73 | 31 | +0.1 | 9500 | +0.5 |
| 54° Wedge (1/2) | 65 | 30 | +0.1 | 9000 | 0 |
| 50° Wedge | 90 | 30 | +0.3 | 9800 | +0.4 |
| 50° Wedge (3/4) | 83 | 28 | +0.1 | 9000 | 0 |
| PW | 102 | 28 | +0.4 | 900 | -1.4 |
| 9 iron | 106 | 26 | +0.4 | 8300 | -1.8 |
| 8 iron | 110 | 23 | +0.5 | 7800 | -2.0 |
| 7 iron | 115 | 21 | +0.6 | 7000 | -2.0 |
| 6 iron | 120 | 18 | +0.7 | 6200 | -1.7 |
| 5 iron | 124 | 16 | +0.9 | 5700 | -1.8 |
| 4 iron | 127 | 14 | +1.0 | 5200 | -2.3 |
| 3 Hybrid | 130 | 13 | -0.4 | 4300 | -3.0 |
| 5 wood | 135 | 13 | -1.0 | 3800 | +2.0 |
| Driver | 152 | 11 | +0.4 | 2700 | -4.0 |

Fig. 8

| Shot Type | Ball Speed [mph] | LaunchAngle [deg] | LaunchDir. [deg] | Spin Rate [rpm] | Spin Axis [deg] | MissHit [%] |
|---|---|---|---|---|---|---|
| 58° Wedge | 2 | 0.9 | 0.7 | 500 | 3.0 | 15 |
| 58° Wedge (3/4) | 3 | 1.5 | 1.1 | 600 | 3.5 | 18 |
| 58° Wedge (1/2) | 2 | 2.0 | 1.5 | 500 | 2.9 | 20 |
| 54° Wedge | 2 | 1.2 | 1.4 | 500 | 3.5 | 15 |
| 54° Wedge (3/4) | 3 | 1.5 | 1.6 | 600 | 3.5 | 18 |
| 54° Wedge (1/2) | 2 | 1.9 | 1.7 | 500 | 2.9 | 20 |
| 50° Wedge | 2 | 1.1 | 1.3 | 500 | 3.2 | 18 |
| 50° Wedge (3/4) | 3 | 1.6 | 1.1 | 600 | 3.0 | 20 |
| PW | 2 | 1.2 | 1.0 | 400 | 3.4 | 25 |
| 9 iron | 3 | 1.0 | 1.3 | 400 | 3.8 | 25 |
| 8 iron | 3 | 1.1 | 1.3 | 400 | 3.5 | 25 |
| 7 iron | 3 | 0.9 | 1.4 | 400 | 3.4 | 26 |
| 6 iron | 3 | 1.0 | 1.6 | 500 | 3.7 | 28 |
| 5 iron | 3 | 1.3 | 1.7 | 500 | 3.8 | 28 |
| 4 iron | 3 | 1.4 | 1.7 | 500 | 4.3 | 31 |
| 3 Hybrid | 3 | 1.5 | 1.2 | 600 | 3.6 | 16 |
| 5 wood | 4 | 1.0 | 2.1 | 400 | 5.3 | 20 |
| Driver | 4 | 1.3 | 2.5 | 500 | 7.0 | 21 |

Fig. 9

METHOD AND DEVICE FOR SIMULATING GOLF SHOTS FOR A USER

PRIORITY CLAIM

The application is a Continuation of U.S. patent application Ser. No. 16/693,920 filed on Nov. 25, 2019; which claims priority to U.S. Provisional Patent Application Ser. No. 62/771,382 filed Nov. 26, 2018. The entire disclosure of these patent(s)/application(s) is expressly incorporated herewith by reference.

TECHNICAL FIELD

The present disclosure relates to a method and a device for simulating golf shots for a user. In addition, the present disclosure relates to the method and the device for providing a shot strategy for the user in view of current shot conditions and user skill.

BACKGROUND

Caddies provides strategy advice to golfers based on a variety of factors. The advice may include, for example, suggestions for golf club selection, swing strength and a target for the golfer's current shot. The advice may also take future shots into account when making recommendations for the current shot. The factors the caddie may consider are numerous, including, for example, a distance from a current ball location to an intended target or to a hazard, a current lie of the ball, environmental conditions, and the golfer's abilities. However, the strategy advice provided by a caddie is limited by the caddie's memory, knowledge, sensory perception, etc.

SUMMARY

The present embodiments are directed to a method of simulating a golf shot for a user, comprises receiving golf course information and receiving historical golf shot capabilities of the user in combination with generating at least one current golf shot simulation based on a current position of a golf ball on the golf course, the golf course information and the historical golf shot capabilities of the user and determining a strategy for the current golf shot based on the at least one current golf shot simulation.

The present embodiments are also directed to a device for simulating a golf shot for a user, comprising an input configured to receive golf course information, historical golf shot capabilities of the user, data corresponding to a position of a golf ball on a golf course and golf course information corresponding to a geographical layout of the golf course and a processor generating at least one simulation of a current golf shot based on a current position of the golf ball on the golf course, the golf course information and the historical golf shot capabilities of the user and determining a strategy for the current golf shot based on the at least one current golf shot simulation.

The present embodiments are also directed to a computer program product operable, when executed on a processor to receive golf course information and receive historical golf shot capabilities of the user and generate at least one current golf shot simulation based on a current position of a golf ball on the golf course, the golf course information and the historical golf shot capabilities of the user. The computer program product determines a strategy for the current golf shot based on the at least one current golf shot simulation.

DETAILED DESCRIPTION

The exemplary embodiments describe an electronic device, for example a mobile computing device such as a smartphone, configured to receive and/or calculate information affecting a golf shot, simulate a trajectory for each of a plurality of golf shot options and determine a strategy for a current shot with the highest probability of minimizing a score for the golfer on the current hole. The electronic device may be in communication with and receive data from a plurality of sources. For example, the electronic device may receive first data relating to the golfer, including the golfer's clubs, shot repertoire and abilities with various clubs. The first data may be captured by a launch monitor such as, for example, a TrackMan® 4 unit, which captures data related to a launch of a struck ball, including 3D launch vectors (e.g., ball speed, launch angle, launch direction), spin rate, spin axis, etc. The first data may further include manual input from the golfer, including launch stats, golf ball aerodynamics, etc. The first data may further be dependent on a current lie of the golf ball. For example, the golfer's abilities may change depending on whether the next shot is taken from the tee box versus the fairway, the rough, an upslope, a downslope, etc. The electronic device may receive second data relating to the golf course. For example, the second data may include a geographic mapping of the golf course including distances and topography, a presence of different cuts of grass (e.g., fairway, rough, green) and hazards (e.g., water, sand, trees), heights, pin placements, etc. The second data may also include current conditions of the golf course, for example, whether the golf course is dry or wet and whether the greens are fast or slow. The electronic device may receive third data relating to environmental conditions. For example, the third data may include a current temperature, altitude, wind conditions, etc.

The exemplary embodiments are described herein as performed at a mobile electronic device, however, other devices or a combination of devices may be used. For example, some processing steps may be performed remotely from the device and communicated to the device via e.g. a telecommunications network. In another embodiment, golf shots/rounds may be simulated at a location remote from an actual golf course, for entertainment or analytical purposes. For example, a professional golf round for a PGA tour player may be observed and simulations may be generated remotely from the golfer for purposes of e.g. PGA tour broadcast analysis. In such a scenario, the golfer and/or golf ball may be positionally tracked via e.g. image tracking, and the simulations updated as the golfer progresses through the round. The announcer on the broadcast may describe the possible options generated (e.g., based on the golfer's historic data or recent performance with various clubs, current lie, etc.) and give a breakdown of the chances of the golfer successfully completing each of the various options. These options may also be simulated for the viewers in a rendering over video of the course or in a computer created topological rendering of the hole the golfer is playing.

In addition, the data concerning the various options may be used to generate wagering opportunities and to compute the payoff for a bet as to the golfer's choice of option and/or as to the success or failure of the golfer's shot to achieve a stated objective (e.g., to achieve a final resting position on the green or on a side of a water hazard closer to the green, etc.). As multiple tournaments are often held on the same days, professional golfers cannot play everyone. A simulation as described above may allow a player to compare potential scores on different courses as compared to, either simulations of other players or to historical winning scores at prior tournaments on these courses to select a tournament at which the player's chances of performing well are maximized In making this decision a golfer may, for example, simulate his play for a round on the golf courses for each of a variety of tournaments with tee and pin placements corresponding to the actual or likely configurations of these courses for their respective tournaments. Similarly, an amateur golfer may simulate rounds on a course for play from different tee positions to determine which tee placements to play from to maximize the chances of achieving a lowest net score factoring in a handicap for the golfer as well as a slope rating for the course.

The various parameters affecting a shot may be represented by correlated statistical descriptors. Each simulated shot may be assigned a value reflecting a level of challenge presented by the shot. For example, the challenge value may be derived from golf literature, and/or may be adjusted to reflect the golfer's ability. For example, a first golfer may excel at golf shots out of a green side bunker and average 1.8 strokes from a green side bunker lie to get the ball in the current hole, whereas a second golfer may struggle at golf shots out of a green side bunker and average 3 strokes to get the ball in the current hole. Different values may be assigned to landing the ball on the green, fairway, etc. reflecting the golfer's likely performance on the remainder of the hole. A dispersion area may be taken into account, reflecting a level of uncertainty for a given golf shot.

The exemplary embodiments track the golfer as the golfer progresses through the course. For example, the electronic device may include a geolocation determining feature such as, for example, GPS. The electronic device may determine a current position of the golfer on a current hole of the course, determine one or more potential paths to the pin of the current hole, and simulate an outcome for each of a plurality of different shot options, based on the first, second and third data. The electronic device may simulate an outcome for each shot option available to the golfer, for example, a driver at full strength with a slight fade, a 5 iron at 75% strength, a pitching wedge chip shot at half strength, etc. The electronic device may then present one or more of the simulated shot options to the golfer via a display as a best option or as ranked options. A wide range of simulated shot options may, based on the analysis, be determined to lack value as options for the golfer, and those shot options may be suppressed (i.e., not presented to the golfer). A number of (e.g., two or three) more favorable options may be displayed to the golfer as options with various indicators as to possible plusses and minuses displayed for each option. The electronic device may further optimize a remainder of the current hole and determine a strategy for a shot with, for example, a lowest score possibility or a highest probability for a score lower than a certain number, such as par, a birdie, eagle, bogie, etc.

The exemplary embodiments may provide a detailed analysis to the golfer at any time during or before a round. The entire round of golf may be simulated for the golfer. For example, the golfer may generate an expected score on the course for each of a plurality of different strategies. The golfer may further control for various aspect of the golfer's game. For example, the golfer may first simulate the round of golf using the golfer's current shot repertoire, and compare the first simulation with a second simulation in which the golfer has added a further shot to the golfer's repertoire. In this way, the golfer may identify which parts of the golfer's game have the most impact on a final score and which aspects should be improved.

The electronic device may further be a golf simulator or may be coupled with a golf simulator. A round of golf may be simulated for another player, such as a PGA Tour player, and the golf simulator may include a game in which a golfer competes with the other player via the simulated round.

By combining the detailed data inputs with the various models described herein potential shots may be simulated and compared with a high degree of granularity. A more basic model might consider, for example, a distance a ball typically travels from a club on a flat surface.

However, the exemplary embodiments implement a ball trajectory model in combination with a bounce and roll model and a detailed course layout, allowing the exemplary embodiments to project a target path of a ball, and take into account potential deviations from the target path, in a very detailed manner. For example, considering an uphill shot, the exemplary model will consider the arc of the ball and whether the path of the ball is likely to clear the hill, including an angle and location at which the ball is likely to impact the hill, and how the ball is likely to roll after the impact, including potentially rolling back downhill. Further considerations, including wind, etc., may further improve the predictive value of the model. The exemplary embodiments provide a method for performing a risk/reward analysis, accounting for the potential risks associated with an off-target shot and the potential benefits associated with an ideal (or near ideal) shot, and generate detailed advice for a user to consider prior to a next shot. This and other uses for the exemplary simulations will be further detailed below.

Figure 1:
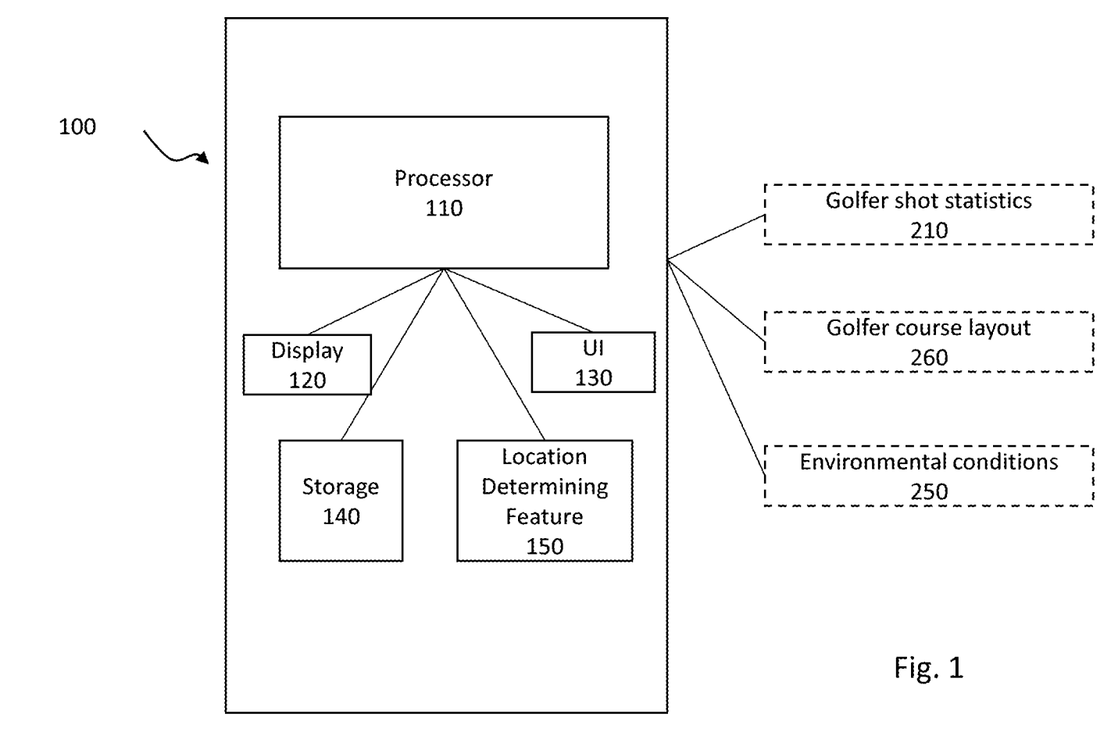
FIG. 1 shows a block diagram of a device according to an exemplary embodiment.

As shown in FIG. 1, a first embodiment of a device 100 for simulating golf shots includes a processor 110, a display 120 and a user interface (UI) 130. The device 100 may have a touchscreen or other interface, on which both the display 120 and the UI 130 are implemented. The device 100 may have a storage 140 in which data relevant to the golf shot simulations is stored. Other data may be communicated to the device 100 remotely via e.g. a telecommunications network. For example, the device 100 may store information about the golfer's shot statistics 210 (i.e., first data) and the golf course layout 260 (i.e., second data), while other information, such as environmental conditions 250 (i.e., third data), may, for example, communicated to the device 100 remotely. The data is shown in FIG. 1 as being received remotely, however, any combination of internal storage and remote storage may be used. Additionally, the device 100 include a location determining feature 150, such as e.g. a GPS, for determining a location from which a shot is to take place. In another embodiment, the user of the device 100 may manually enter a shot location via the UI 130. In still another embodiment, the user's golf ball is tracked remotely via e.g. image or radar tracking, and the current location of the ball is transmitted to the device 100 for use in further processing.

Figure 2:
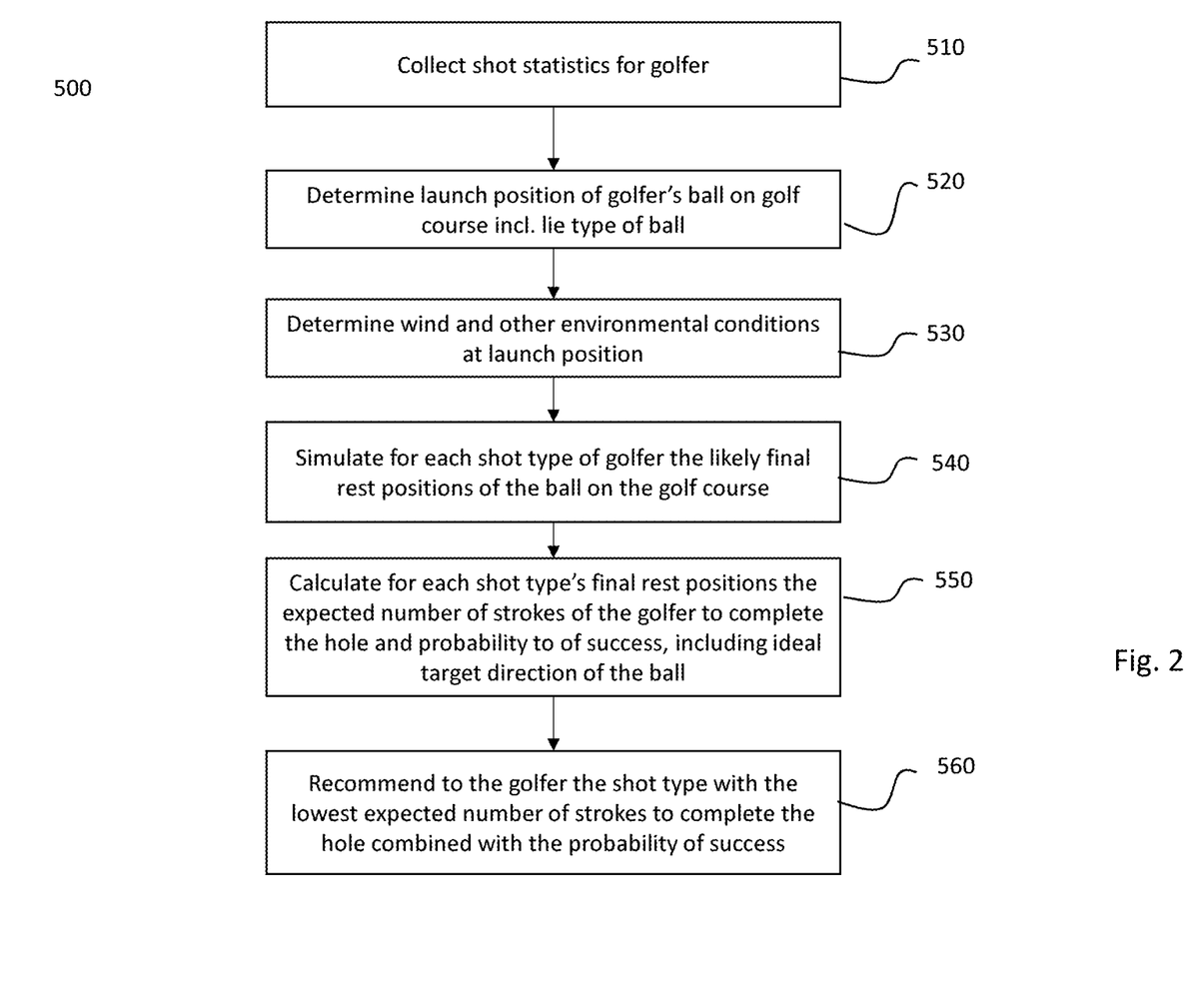
FIG. 2 shows an exemplary process 500 of operation of the device of FIG. 1.

FIG. 2 shows a process/method 500 for generating optimized caddie advice for the golfer using the device 100. The most effective caddie advice generally involves the description of a golf shot type including a golf club to be used, a direction in which the ball is to be launched, swing speed etc., that will enable the golfer to complete the hole in the fewest number of shots.

Figure 8:
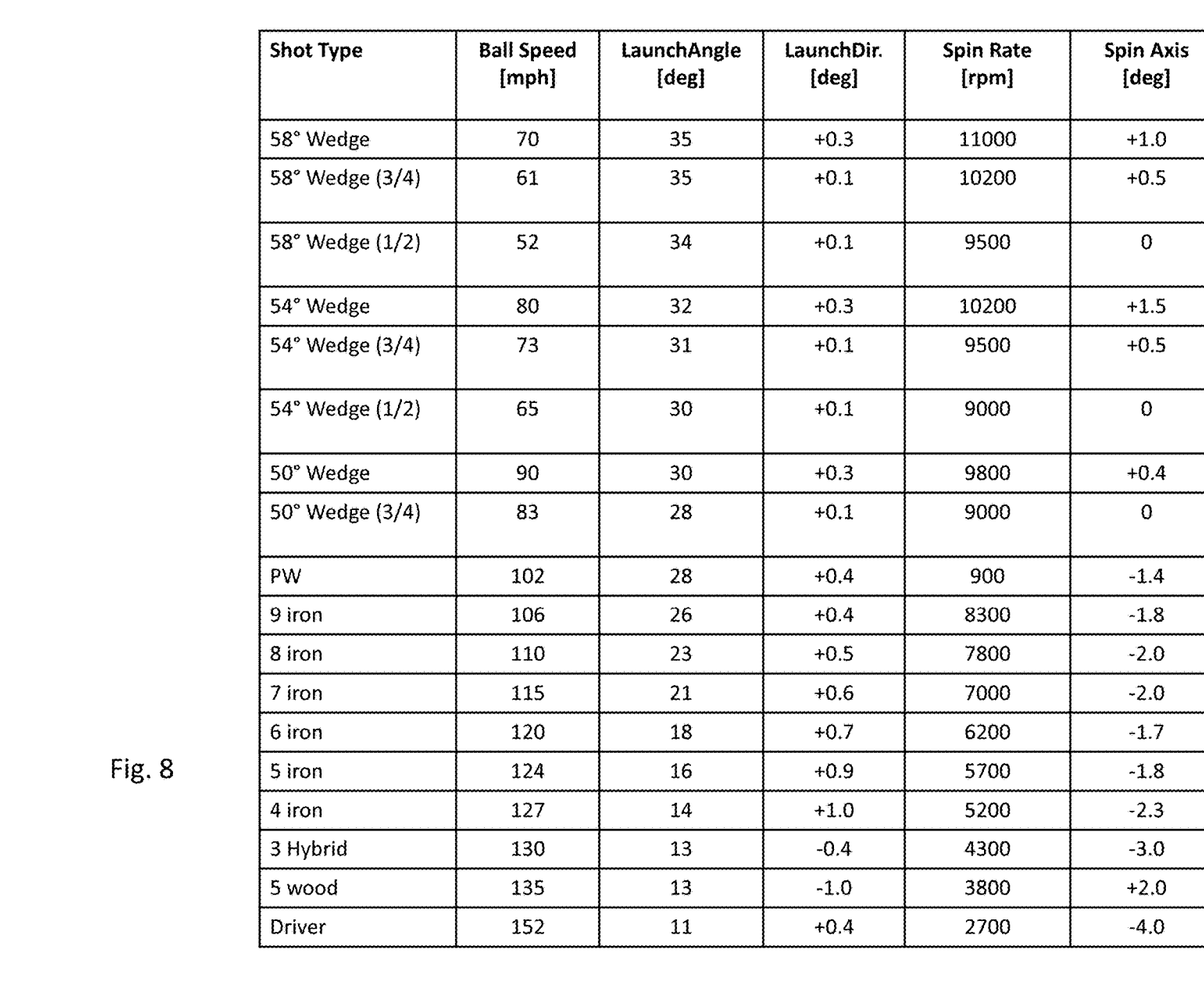
FIG. 8 shows a table including average launch conditions for each shot type for a typical golfer.
Figure 9:
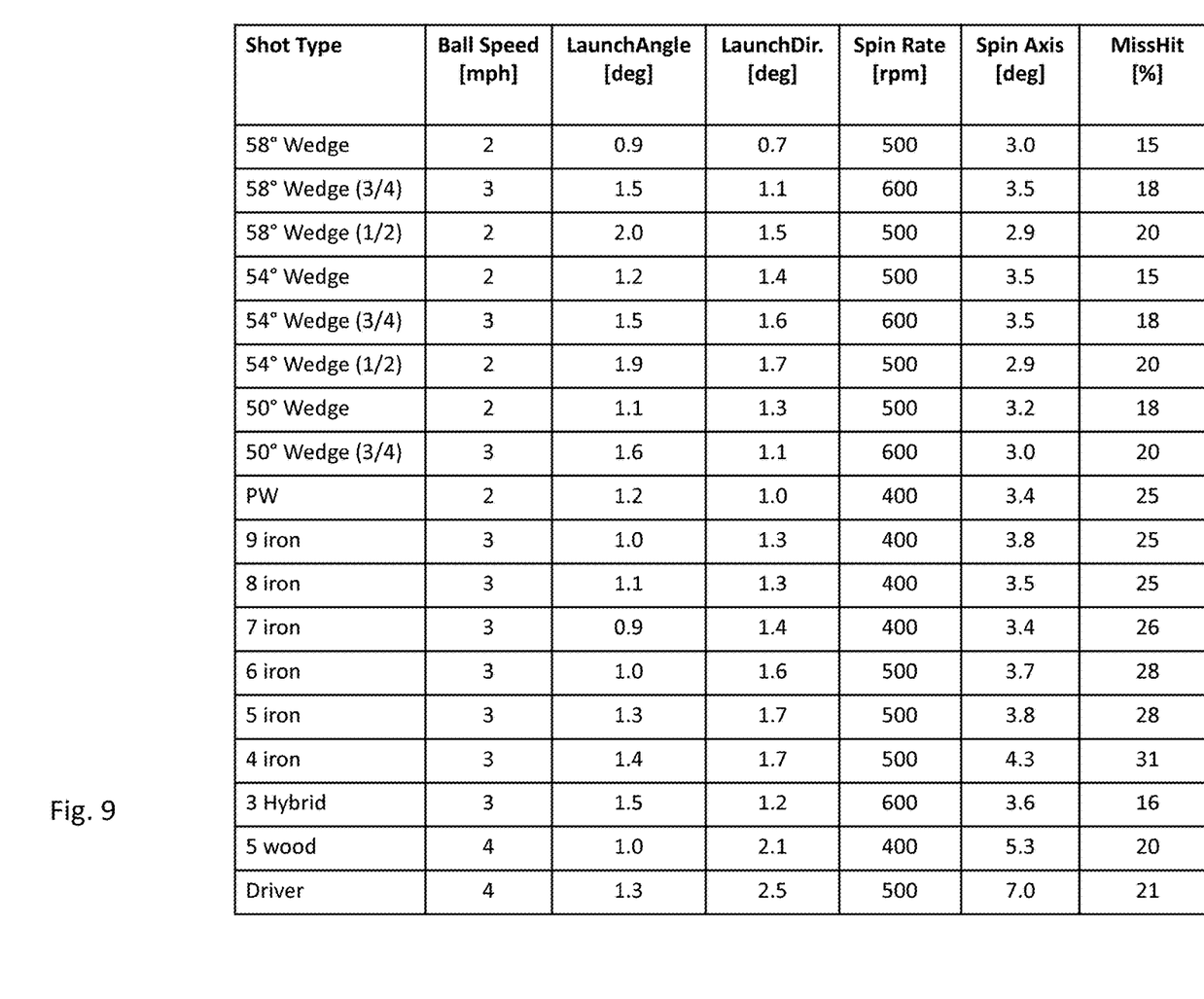
FIG. 9 shows a table including standard deviations for each parameter for each shot type together with a miss-hit percentage for each shot type.

In step 510, the golfer shot statistics 210 are collected. In this embodiment, the device 100 has access to shot statistics for golf clubs available to the golfer and for distinct swing types the golfer can execute with each available golf club. Each unique combination of club and swing type is referred to herein as a shot type. Exemplary shot statistics for an exemplary set of clubs are shown in the table of FIG. 8. As seen in FIG. 8, the table includes results based on average launch conditions for each shot type for the golfer. The shot statistics 210 may be characterized in many different ways for each shot type. For example, this may be average distance and/or dispersion area, but these shot statistics 210 may more preferably be represented by launch characteristics of the ball such as ball speed, launch angle, launch direction, spin rate and spin axis—all parameters being represented by correlated statistical descriptors. A simple form of a statistical descriptor, shown in FIG. 9, shows a standard deviation for each parameter for each shot type together with a miss-hit percentage. The golfers' shot statistics may be captured by a launch monitor such as, for example, by a TrackMan® 4 unit as would be understood by those skilled in the art. Furthermore, the information in FIGS. 8 and 9 may be directly derived from one or more sessions with a launch monitor.

Figure 6:
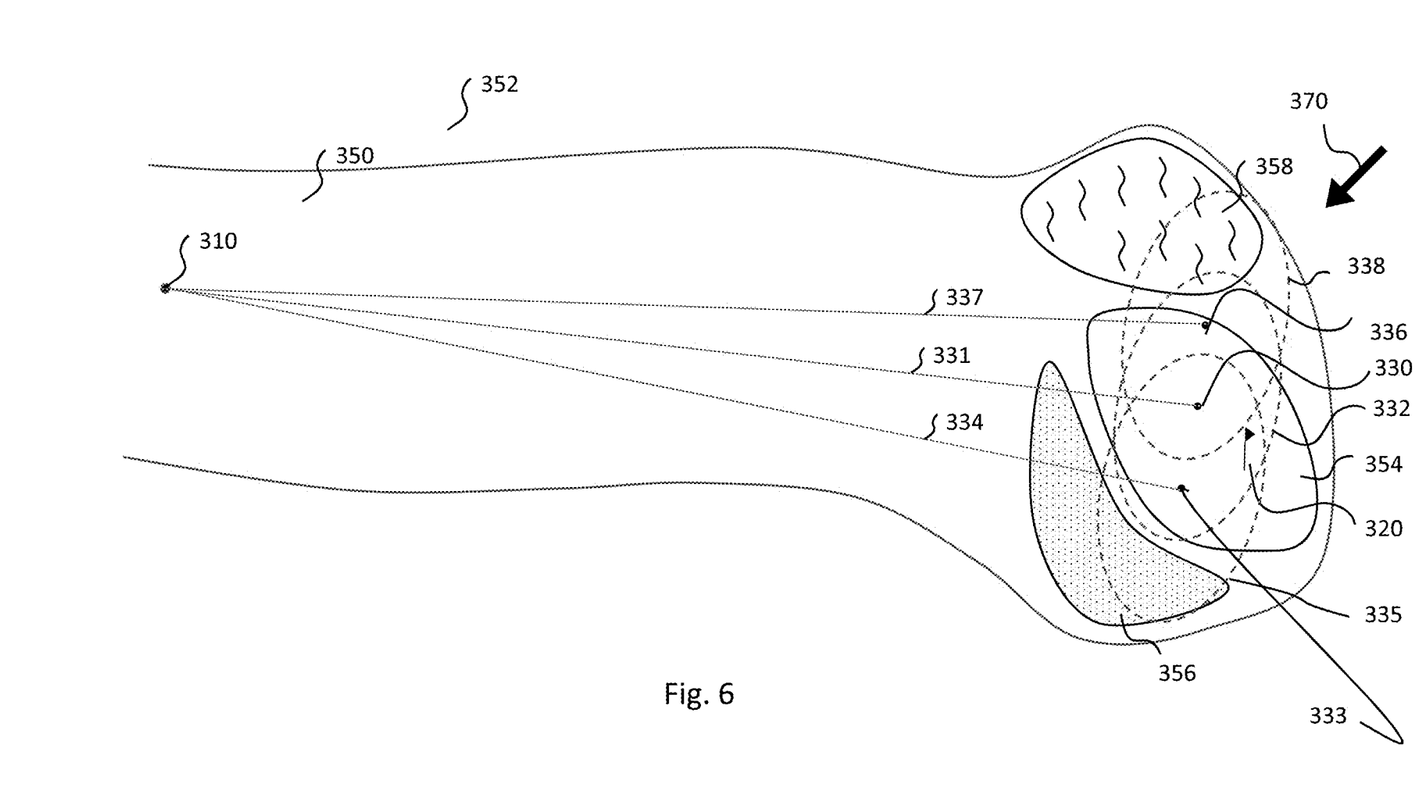
FIG. 6 shows three different target directions for the same shot type N.

In step 520, the launch position 310 of the ball on the golf course, as shown in FIG. 6, is determined. This may be done automatically by various geolocation determining means such as GPS on the device or the golfer, beacons, etc. Alternatively, the position may be entered manually via, for example, input to a graphical layout of the golf hole on the UI 130 by the golfer. Furthermore, in place of the geolocation determining device, the user may use a range finder that determines a position of the golfer and ball relative to a target (e.g., the hole or a center of the green) that is generated without additional information about the golf course. Optionally the lie of the golf ball 212 may also be input, since this may have an impact on the launch conditions for a given swing type, the launch position 310 and the lie of the golf ball 212 being referred to collectively as the ball launch conditions 215. If the golf course being played is a golf simulator (i.e., where balls hit are projected into a virtual environment simulating a golf course), the golf simulator may automatically communicate a ball location and, optionally, lie information to the processor 110.

In step 530, the environmental conditions 250 are determined. The environmental conditions 250 may include one or more of wind speed and direction, temperature, pressure, humidity and other factors that will have an influence on the aerodynamics of the ball. Those skilled in the art will understand that this information may optionally be omitted. However, this may reduce the accuracy of certain of the predictions made by the device 100. This information, for example, may be collected from a weather station close to the golf course or from an online weather information service, or may be manually input. When the user is playing on a golf simulator, the golf simulator may communicate environmental conditions information to the processor 110. The environmental conditions 250 may also be estimated by the golfer or, alternatively, predetermined values may be assigned to one or more of the parameters (e.g., no wind, 20 degrees Celsius and normal air pressure).

In step 540, each of the shot types is simulated by the processor 110 using the shot statistics 210, the environmental conditions 250, the golf course layout 260 and, optionally, information about ground conditions 270. The details of the shot type simulations will be described below.

Figure 3:
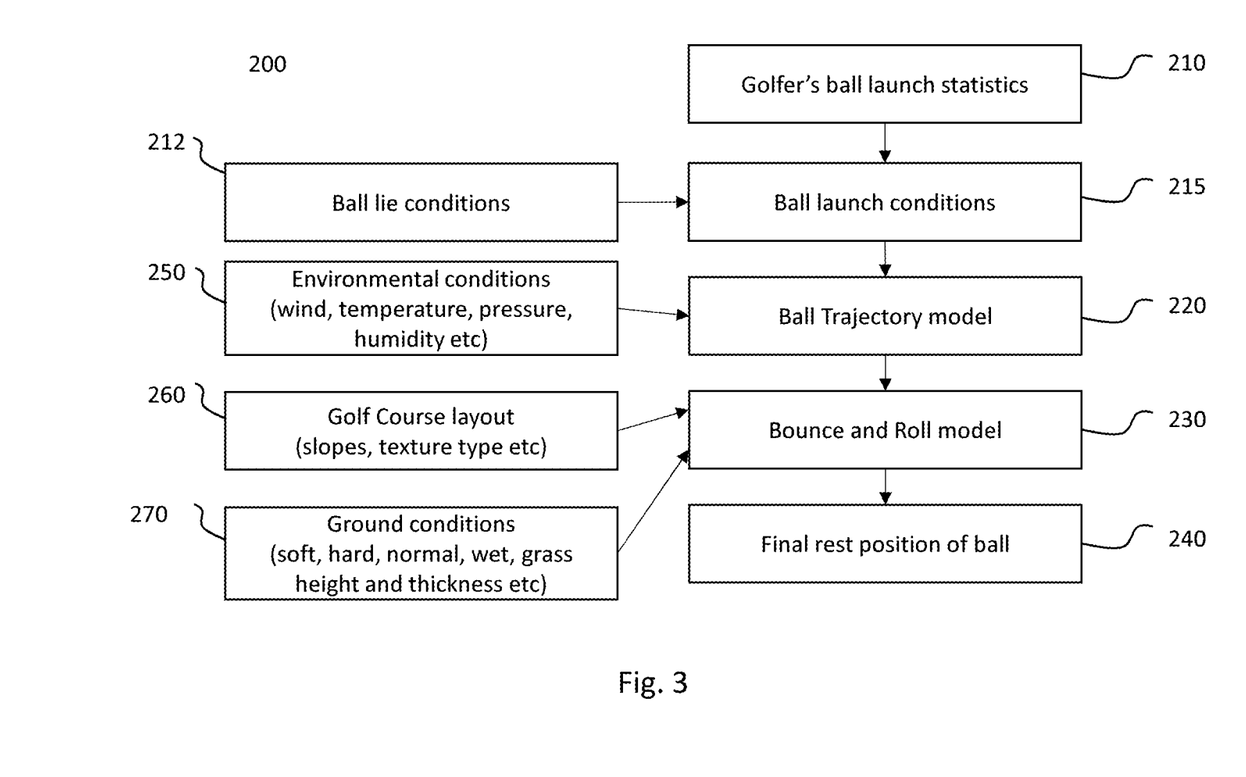
FIG. 3 shows the steps performed in a process for simulating golf shots on a golf course to be used in the process of FIG. 2.

FIG. 3 shows data inputs and processing steps performed to simulate each shot type based on the golfers shot statistics 210 (e.g., likely launch parameters) and statistical descriptions such as those included in FIGS. 8 and 9. The simulations enable the device 100 to generate a statistical description of the final rest position of the ball for each shot type. One way to do this is to simulate a number of shots, each having a specific ball launch condition 215, representing the shot statistics and determine a corresponding final rest position of the ball for each shot 240, which then provides a statistical presentation of the final rest position of a given shot type given the golf course layout 260, ground conditions 270, etc. As indicated in step 212, the specific ball launch conditions 215 may be altered based on information received about the lie of the ball 212.

The trajectory for each ball launch condition is modelled by a ball trajectory model 220 and a bounce and roll model 230. Various ball trajectory models are known in the art to determine a flight path and landing location for a ball. One such trajectory model is available at http://www.math.union.edu/~wangj/courses/previous/math238w13/Golf%20Ball%20Flight%20Dynamics2.pdf. The simulation for each shot type also requires the simulation of a bounce and roll of the golf ball after its initial impact with the ground at the landing location. Various bounce and roll models are known to those skilled in the art. For example, a bounce and roll model is available at http://en.wikipedia.org/wiki/Bouncing_ball.

Figure 4A:
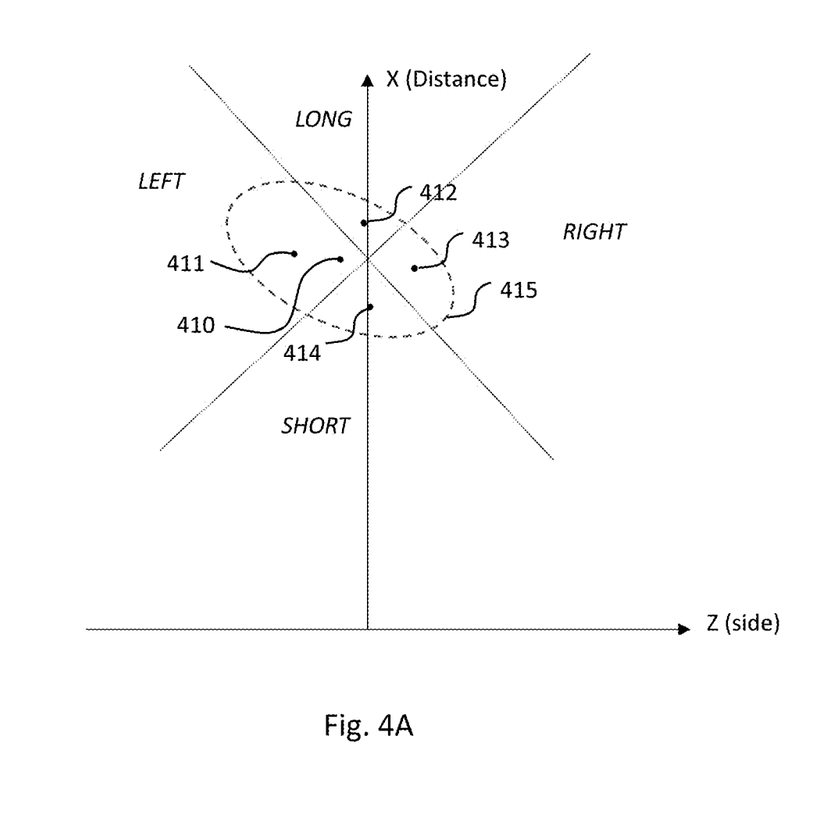
FIG. 4A shows an exemplary statistical representation of a final rest positions for a golf shot type N.
Figure 4B:
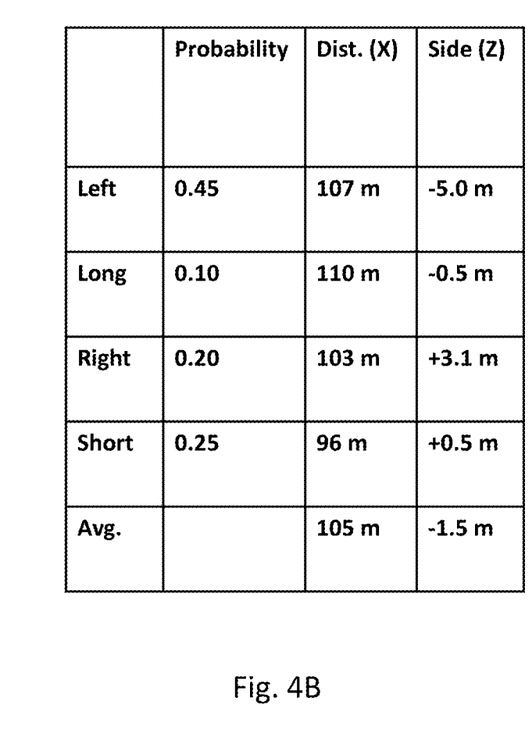
FIG. 4B shows a table including an example of a statistical description of the final rest positions of FIG. 4A.

Based on the results of the simulation for each shot type, a statistical description of a final rest position 240 is determined for each shot type. This statistical description of the final rest position may, for example, be represented by numbers as shown in FIG. 4A which may, for example, be overlaid on a graphic representation of the golf hole showing the target and hazards, etc. Essentially the statistical description of the final rest position is a two dimensional probability density function p(X,Z), which reflects the probability p of the ball's final rest position being at the distance X and side Z, where side Z is relative to the intended target direction. In FIG. 4A the average final rest position of the ball is 410. In FIG. 4 the statistical description is simplified to 4 different scenarios (long, short, left and right) each with an associated probability Pi. The average final rest position of shot ending left of the target is 411 and similar for shots long 412, right 413 and short 414. In FIG. 4B an example of a statistical description of the final rest positions is shown.

Figure 5:
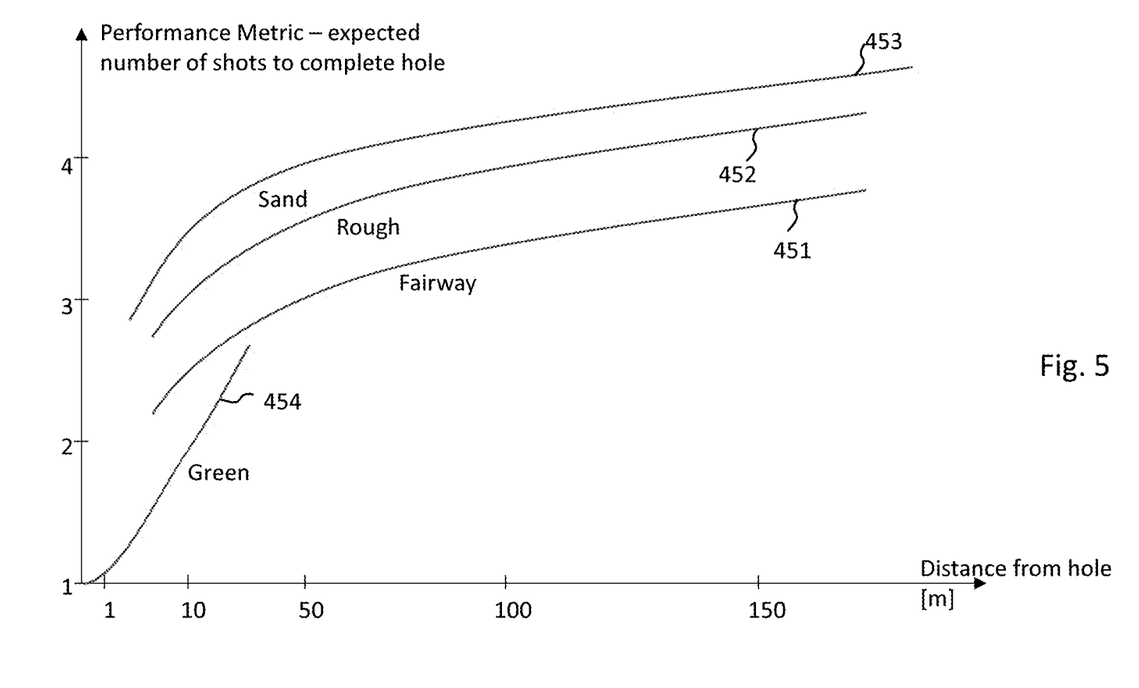
FIG. 5 shows exemplary performance metrics used to calculate an expected number of shots required for the golfer to complete the hole.

In step 550, the statistical description of the final rest position for each shot type is scored by a performance metric which may, for example, be an expected number of strokes required to complete the hole. This metric may, alternatively, be 'strokes gained' as defined by Mark Broadie in the book "Every Shot Counts" ISBN 9781592407507. As understood by those skilled in the art, strokes gained may be determined for PGA Tour professionals from the Shot Link database, see https://www.pgatour.com/stats/academicdata/shotlink.html The strokes gained for each golfer may differ from those of the PGA Tour professionals, in particular, when the skill level of the golfer is significantly lower than that of Tour professionals. Strokes gained may be calculated for other skill levels using the same statistical approach as for Tour professionals. The performance metric will be dependent on the remaining distance to the hole (i.e., the distance from the final resting position to the hole) and the lie conditions associated with the final rest position of the ball for each shot type. In FIG. 5 an example of performance metrics vs distance to hole is shown for each of the lie conditions associated with the determined final rest positions for the shots.

The performance metric for each shot type is calculated by summing the performance metrics for all of the shots in the statistical description of the final rest positions weighted by the probability for each shot. This can be described by the equation below for shot type N:

$$\text{PerfMetric}_{ShotTypeN} = \Sigma_{i\ all\ shots} \text{prob}_i \cdot \text{PerfMetric}_i \quad [\text{eqn 1}]$$

Where $\Sigma_{i\ all\ shots}\text{prob}_i = 1$.

PerfMetric$_i$ depends for the shot i on the distance to the hole and lie conditions associated with the final rest position, for example, shown in FIG. 5.

Since the performance metric depends on the lie conditions and final rest positions, the performance metric also depends on an initial target direction from the ball location 310 toward the hole as shown in FIG. 6 which shows three different target directions 331, 334 and 337. For each of the target directions 331, 334 and 337, the statistical description of the corresponding final rest position may be determined based on the average rest positions 330, 333 and 336, as well as dispersion contours 332, 335 and 338 which correspond, respectively, to the target directions 331, 334 and 337. The performance metric, as calculated by [eqn. 1] for each of the target directions in FIG. 6 will clearly not be the same. The optimal target direction determined in step 550, is the target direction selected from the different target directions tested for each shot type N, that gives the lowest PerfMetric. The granularity between the target directions tested needs to be at a level at which it is possible for the golfer to control the initial launch direction of the ball. Typically, a golfer will not be able to control the target direction to within a range less than 0.5 degrees. As a practical matter, a variation of the target directions to find the optimal target direction is quite limited and will typically span between within ±5 degrees of the direct line to the center of a target area (e.g., a center of the fairway or a center of the green), which together with a granularity of 0.5 degrees results in 11 target directions to test. The processor 110 will, for each shot type N, identify the lowest performance metric and select the associated optimal target direction in step 550.

In FIG. 6 the launch position of the ball 310 is located on the fairway 350, with the hole 320 located on the green 354. The golf course will typically also include rough 352, sand bunkers 356 and water hazards 358. The wind direction and speed 370 will have an impact on the ball trajectory and thereby the final rest position of the ball.

Figure 7:
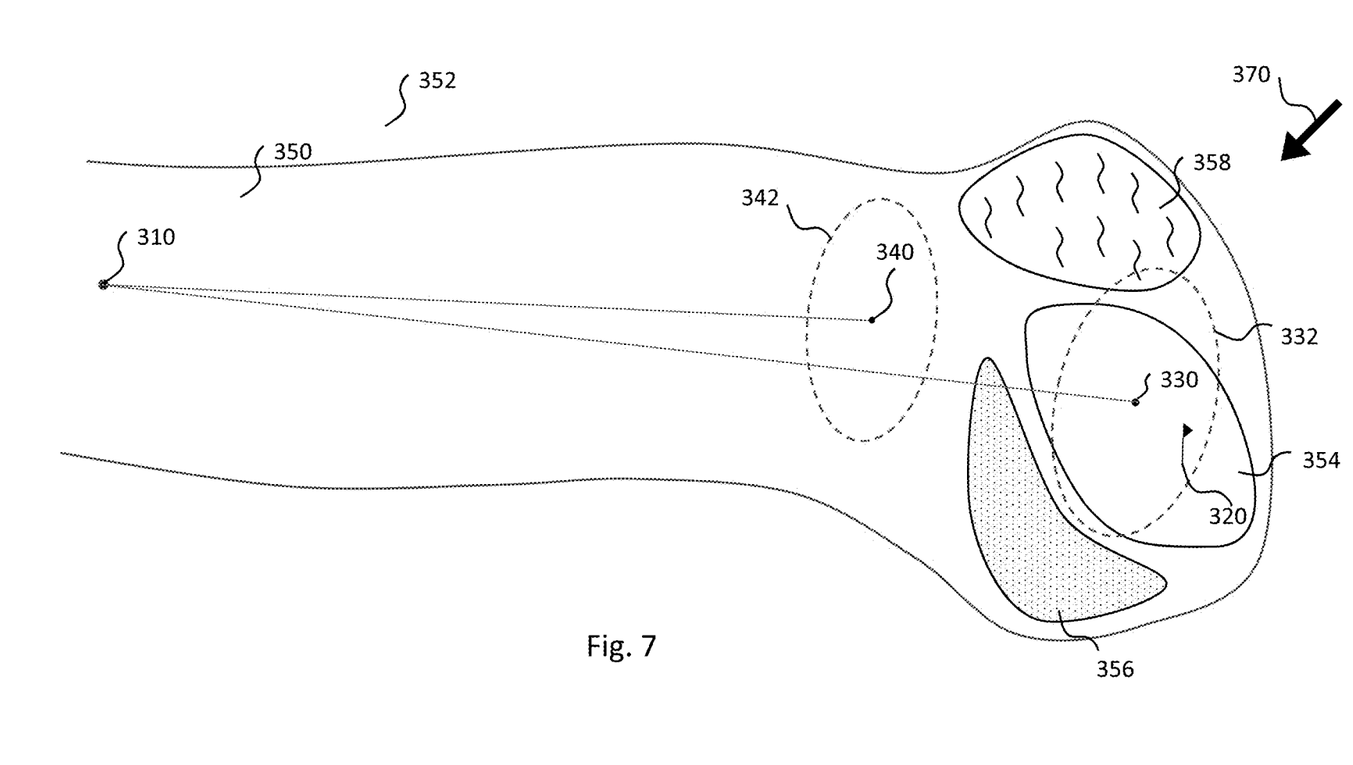
FIG. 7 shows two different shot types each with optimal target directions.

The processor performs the simulations and determines an optimal target direction for each shot type N and determines a performance metric for each shot type N. An example of two optimal shot types is shown in FIG. 7. The first shot type is represented by an average final rest position 330 and a dispersion contour 332 while the second shot type is represented by an average final rest position 340 and a dispersion contour 342. In step 560, the processor selects the shot type of all the shot types considered that has the lowest performance metric. This shot type is communicated to the golfer via, for example, by the display 120 in a form constructed to mimic advice a caddie would provide to the golfer in similar circumstances. This may, for example, take a form such as "try a 5 iron aimed 5$m$ to the left of the flag."

Optionally, the caddie advice may be accompanied by a graphic similar to FIG. 7 so the golfer understand more fully the reasoning backing up the caddie advice. The device 100 may also suggest multiple options with different caddie suggestions each including associated metrics and/or graphical presentations. In particular, many situations on a golf course will offer both an aggressive strategy (e.g., hitting directly toward the hole) having slightly increased risk but, if executed successfully, corresponding to a probability of obtaining a lower score and a safer shot typically having a target direction to the center of the green (or avoiding a hazard) more likely to be safely executed but likely to result in more difficult subsequent shot (e.g., a longer putt) to complete the hole.

Alternatively, the advice may be presented as several options with varying risk/reward profiles. For example, a first option may indicate to the user that he may complete the current hole in 2 shots while breaking down the likelihood that this golfer can complete the shots as required. A second option may then indicate a strategy for completing the hole in 3 additional shots, while further options outline progressively higher likelihood scenarios so that as the number of shots required for each option increases (i.e., the scores get progressively worse) the ease and likelihood of successfully employing the strategy increase. Such options may be show, for example, as follows: For shot type A completing the hole in: 2 shots or less 5%, 3 shots or less 30%, 4 shots or less 50%, 5 shots or less 70%, and for shot type B completing the hole in: 2 shots or less 1%, 3 shots or less 25%, 4 shots or less 55%, 5 shots or less 85%. Alternatively the options are presented in this way: Option 1: complete hole in 2 shots or less—5% (shot type A), 1% (shot type B); Option 2: complete hole in 3 shots or less—30% (shot type A), 25% (shot type B); Option 3: complete hole in 4 shots or less—50% (shot type A), 55% (shot type B); and Option 4: complete hole in 5 shots or less—70% (shot type A), 85% (shot type B). In each of these options, 2 types of shot are presented with a percentage likelihood that this golfer can successfully outline the shot (which would be detailed in the output).

Many of the optimizations explained above are optional and are not necessary to follow for the concept of the present invention. It may, for example, be desirable to omit the optimization of the target direction for each shot type, by simply assigning a line from the launch location to a center of the fairway or green as the target direction. Those skilled in the art will understand that this device may be implemented as a program installable and operable on, for example, a smartphone or other mobile computing device. For example, the program may be an app that is installable on a smartphone to utilize already installed location determining services and mapping software along with any additional information from, for example a camera of a smartphone and that any division of the operations of such a system may be divided between a local processor in the mobile device and a remote processor or processors and the data utilized may be similarly divided in any manner between locally stored data and data streamed or otherwise received by the mobile device (e.g., wirelessly) as needed.

The performance metric calculation in step 550 may also be omitted while displaying for the golfer the final rest position for each of the shot types, preferably with an average final rest position and a dispersion contour or similar as described above. In this case, the golfer may select the caddie advice by reviewing a graphical representation on the display 120 of the golf hole similar to that shown in FIG. 7.

The invention claimed is:

1. A method for simulating a golf shot for a user, comprising:
generating a plurality of golf shot simulations for completing a hole on a golf course based on a current position of a golf ball on the golf course, golf course information and historical golf shot capabilities of the user for a set of different shot types, the historical golf shot capabilities comprising launch parameters including one or more of speed, spin rate and spin axis of a ball launch, wherein each of the launch parameters is represented by a correlated statistical descriptor for each of the respective shot types, wherein each of the plurality of simulations is generated as a three-dimensional path of a simulated shot using simulated launch parameters including one or more of a simulated speed, a simulated spin rate and a simulated spin axis for a given shot type and applying a ball trajectory model in view of the simulated launch parameters to determine a simulated final rest position of the simulated shot on the golf course, wherein the simulated launch parameters for the simulated shot are determined based on the launch parameters, wherein the simulated final rest position is associated with a probability,
wherein a first simulation is generated from the current position and at least one second simulation is successively generated for completing the hole from a first simulated final rest position of the first simulation; and
determining a strategy from the current position including a probability for completing the hole in a number of shots based on the simulated final rest positions and associated probabilities for the first simulation and the at least one second simulation.

2. The method of claim 1, wherein the golf course is a simulated golf course in a virtual environment.

3. The method of claim 2, further comprising generating the at least one current golf shot simulation based on current environmental conditions associated with the current position of the golf ball on the golf course.

4. The method of claim 3, wherein the current environmental conditions include at least one of wind speed, wind direction, temperature, pressure and humidity.

5. The method of claim 2, wherein the launch parameters further include one or more of angle and direction for the ball launch.

6. The method of claim 2, wherein the golf course information includes information related to at least one of golf hole distance, golf hole placement, topography, ground conditions and hazards.

7. The method of claim 2, further comprising:
simulating at least two golf shot options based on a set of shot parameters based on the historical golf shot capabilities of the user, wherein a first one of the golf shot options is simulated using at least one different shot parameter than a second one of the golf shot options; and
determining the strategy for the user by choosing one of the simulated golf shot options having a probability for a lowest score possibility relative to the other ones of the simulated golf shot options.

8. The method of claim 2, wherein a bounce and roll model predicts a final rest position of the golf ball for each of the simulated golf shot options based on the simulated initial impact of the golf ball with the golf course and a topography of the golf course at the simulated initial impact.

9. The method of claim 1, further comprising:
determining a dispersion area for the simulation, the dispersion area reflecting an area within which a golfer's attempt at a simulated shot is likely to land based on a degree of uncertainty for the simulation corresponding to the historical golf shot capabilities of the user.

10. The method of claim 9, further comprising:
displaying the simulation on a display, the displayed simulation including a simulated path of the golf ball and a dispersion contour based on the dispersion area.

11. The method of claim 10, further comprising:
generating a first golf shot simulation for a golf shot taken with a first golf club and a second golf shot simulation for a golf shot taken with a second golf club; and
displaying the first and second simulations simultaneously on the display for visual comparison, wherein the displayed first and second simulations comprise graphical representations of the first and second simulations overlaid on a geographical layout of the golf course.

12. The method of claim 1, further comprising determining an expected number of golf shots required by the user to complete a hole corresponding to a first shot strategy based on the historical golf shot capabilities of the user and the current position of the user.

13. The method of claim 12, further comprising generating a second shot strategy wherein the first shot strategy results in a lower number of expected shots and having lower calculated odds of success, the second shot strategy resulting in more expected golf shots and having calculated odds of success higher than for the first shot strategy.

14. The method of claim 1, further comprising positionally tracking at least one of the user and the golf ball to determine a launch location for a golf shot.

15. The method of claim 14, wherein a GPS performs the positional tracking.

16. The method of claim 14, wherein at least one of a radar and an imager performs the positional tracking.

17. The method of claim 1, further comprising manually inputting launch location information via a user interface.

18. A device for simulating a golf shot for a user, comprising:
a memory storing golf course information, historical golf shot capabilities of the user for a set of different shot types, wherein the historical golf shot capabilities comprise launch parameters including one or more of speed, spin rate and spin axis of a ball launch, wherein each of the launch parameters is represented by a correlated statistical descriptor for each of the respective shot types, data corresponding to a position of a golf ball on a golf course and golf course information corresponding to a geographical layout of the golf course; and a processor generating a plurality of golf shot simulations for completing a hole on the golf course based on a current position of the golf ball on the golf course, the golf course information and the historical golf shot capabilities of the user, wherein each of the plurality of simulations is generated as a three-dimensional path of a simulated shot using simulated launch parameters including one or more of a simulated speed, a simulated spin rate and a simulated spin axis for a given shot type and applying a ball trajectory model in view of the simulated launch parameters to determine a simulated final rest position on the golf course, wherein the simulated launch parameters for the simulated shot are determined based on the launch parameters, wherein the simulated final rest position is associated with a probability, wherein a first simulation is generated from the current position and at least one second simulation is successively generated for completing the hole from a first simulated final rest position of the first simulation, the processor determining a strategy from the current position including a probability for completing the hole in a number of shots based on the simulated final rest positions and associated probabilities for the first simulation and the at least one second simulation.

19. The device of claim 18, wherein the golf course is a simulated golf course in a virtual environment.

20. The device of claim 19, wherein a bounce and roll model considers simulated ground conditions including one or more of soft ground conditions, hard ground conditions, or normal ground conditions.

21. The device of claim 19, wherein a bounce and roll model considers simulated ground conditions including one or more of fairway ground conditions, rough ground conditions, or green ground conditions.

* * * * *